United States Patent
Kawaura

(10) Patent No.: US 11,442,672 B2
(45) Date of Patent: Sep. 13, 2022

(54) INFORMATION PROCESSING APPARATUS AND METHOD FOR CONTROLLING THE SAME

(71) Applicant: CANON KABUSHIKI KAISHA, Tokyo (JP)

(72) Inventor: Toshinori Kawaura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/235,783

(22) Filed: Apr. 20, 2021

(65) Prior Publication Data

US 2021/0240402 A1    Aug. 5, 2021

Related U.S. Application Data

(63) Continuation of application No. 16/521,448, filed on Jul. 24, 2019, now Pat. No. 11,023,183.

(30) Foreign Application Priority Data

Aug. 1, 2018  (JP) .............................. JP2018-145044

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *H04N 1/00031* (2013.01); *H04N 1/00037* (2013.01)

(58) Field of Classification Search
None
See application file for complete search history.

(56) References Cited

U.S. PATENT DOCUMENTS

| | | | | |
|---|---|---|---|---|
| 2008/0211854 A1* | 9/2008 | Takahashi | ............... | B41J 19/145 347/19 |
| 2011/0102832 A1* | 5/2011 | Iwashita | ............ | H04N 1/00437 358/1.15 |
| 2014/0298115 A1* | 10/2014 | Sugiyama | ............. | G06F 3/1286 714/49 |

FOREIGN PATENT DOCUMENTS

| | | |
|---|---|---|
| JP | 2002-123383 A | 4/2002 |
| JP | 2004-042280 A | 2/2004 |
| JP | 2004-110393 A | 4/2004 |

* cited by examiner

*Primary Examiner* — Frantz Bataille
(74) *Attorney, Agent, or Firm* — Canon U.S.A., Inc. IP Division

(57) ABSTRACT

A method for controlling an information processing apparatus includes a notifying step of, if an error is occurring in a printing apparatus under non-completion of an initial setting process for the printing apparatus when a predetermined program is operating on the information processing apparatus, executing a notification process for notifying a user of the error occurring in the printing apparatus on the basis of error information, the initial setting process being a process executed in response to the user turning on the printing apparatus for a first time after the printing apparatus is unpacked, and not executing the notification process if an error is occurring in the printing apparatus under completion of the initial setting process for the printing apparatus when the predetermined program is operating on the information processing apparatus.

31 Claims, 10 Drawing Sheets

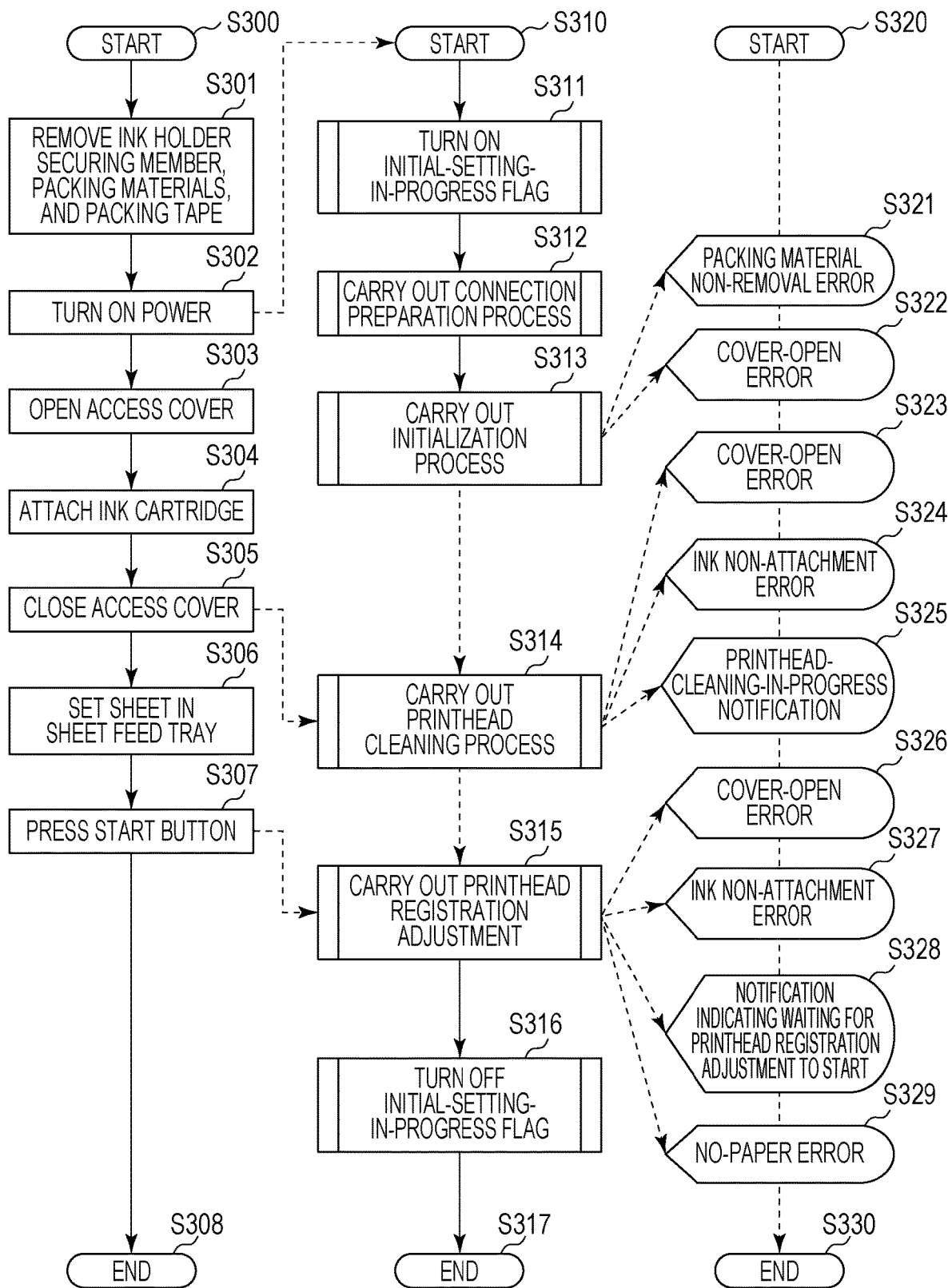

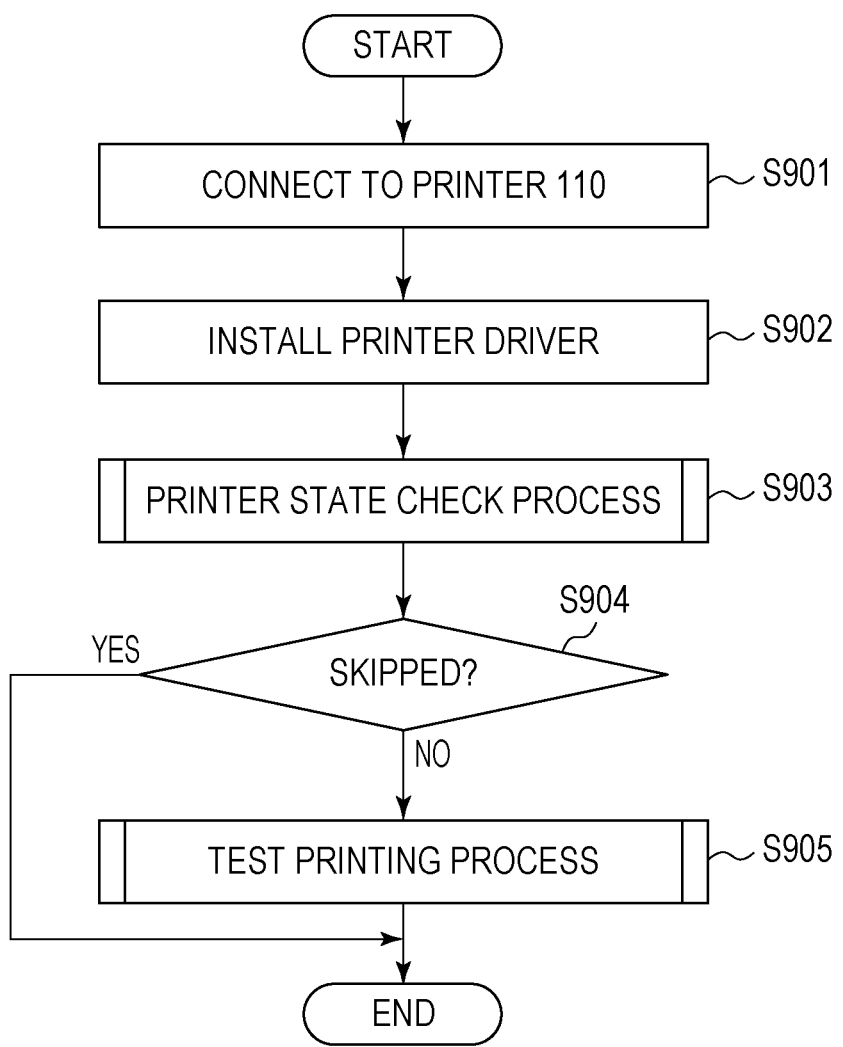

INFORMATION PROCESSING APPARATUS AND METHOD FOR CONTROLLING THE SAME

CROSS REFERENCE TO RELATED APPLICATIONS

This application is a continuation of U.S. application Ser. No. 16/521,448, which was filed on Jul. 24, 2019 and which claims priority to Japanese Patent Application No. 2018-145044, which was filed on Aug. 1, 2018, all of which are hereby incorporated by reference herein in their entireties.

BACKGROUND

Field of the Disclosure

The present disclosure relates to an information processing apparatus and a method for controlling the same.

Description of the Related Art

A printing apparatus is known that executes an initial setting process in response to a user turning on the printing apparatus for the first time after the printing apparatus is unpacked. An initial setting process may also be executed following a 'factory reset' or another process which reverts the printing apparatus to a configuration as if it is to be used for a first time. Also, an information processing apparatus is known that notifies the user of an error occurring in the printing apparatus.

Japanese Patent No. 3880243 describes an information processing apparatus that notifies a user of an error that has occurred in a printing apparatus during a time in which the printing apparatus executes an initial setting process.

With the increasing prevalence of information processing apparatuses that notify users of errors occurring in printing apparatuses, there has been an increasing demand for more appropriate notification methods for notifying users of errors occurring in printing apparatuses.

SUMMARY

Accordingly, the present disclosure provides appropriate notification of an error occurring in a printing apparatus.

An aspect of some embodiments provides a method for controlling an information processing apparatus configured to communicate with a printing apparatus and having a predetermined program. The method includes obtaining error information, the error information being information concerning an error occurring in the printing apparatus; executing a notification process for notifying a user of the error occurring in the printing apparatus on the basis of the error information, if an error is occurring in the printing apparatus under non-completion of an initial setting process for the printing apparatus when the predetermined program is operating on the information processing apparatus; and not executing the notification process if an error is occurring in the printing apparatus under completion of the initial setting process for the printing apparatus when the predetermined program is operating on the information processing apparatus.

Further features of various embodiments will become apparent from the following description of exemplary embodiments with reference to the attached drawings.

BRIEF DESCRIPTION OF THE DRAWINGS

FIG. 3 illustrates processes executed by apparatuses and a user for initial setting of the communication apparatus.

FIG. 9 is a flowchart illustrating an initial setting process executed by the information processing apparatus.

DESCRIPTION OF THE EMBODIMENTS

The following describes exemplary embodiments in detail with reference to the accompanying drawings. It should be noted that the following embodiments are not intended to limit the scope of the appended claims, and that not all the combinations of features described in the embodiments are necessarily required by every embodiment.

First Embodiment

An information processing apparatus and a communication apparatus, which are included in a communication system according to this embodiment, will be described. In this embodiment, a personal computer (PC) is a non-limiting example of the information processing apparatus. Examples of the information processing apparatus include a mobile terminal, a notebook PC, a tablet terminal, a personal digital assistant (PDA), and a digital camera. In this embodiment, furthermore, a printer is a non-limiting example of the communication apparatus. Examples of the communication apparatus include apparatuses capable of wirelessly communicating with the information processing apparatus. Examples of the printer include an inkjet printer, a full-color laser beam printer, and a monochrome printer. Other examples of the communication apparatus include a copying machine, a facsimile machine, a mobile terminal, a smartphone, a notebook PC, a tablet terminal, a PDA, a digital camera, a music playing device, and a television set. Other examples include a multifunction peripheral having multiple functions such as a copying function, a facsimile (FAX) function, and a printing function.

Figure 1:
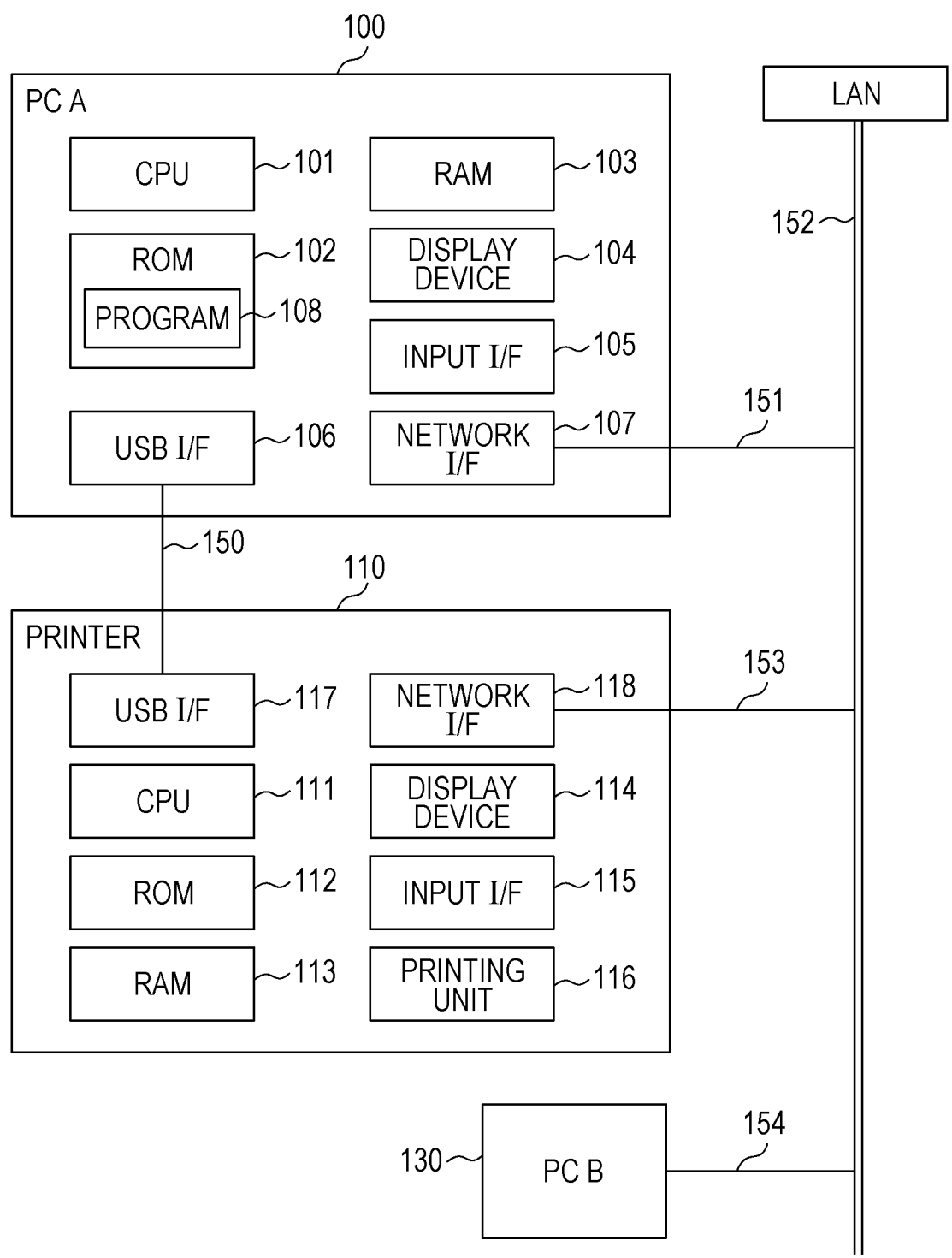
FIG. 1 illustrates a hardware configuration of apparatuses included in a communication system.

FIG. 1 illustrates a hardware configuration of apparatuses included in a communication system according to this embodiment. The communication system according to this embodiment includes a PC A 100, a PC B 130, and a printer 110. The PC A 100 and the PC B 130 are information processing apparatuses, and the printer 110 is a communication apparatus. In this embodiment, two information processing apparatuses included in the communication system are both PCs, by way of example but not limited thereto. For example, one of the information processing apparatuses may be a PC, and the other information processing apparatus may be a smartphone.

The PC A 100 includes a central processing unit (CPU) 101, a read-only memory (ROM) 102, a random access memory (RAM) 103, a display device 104, an input interface (I/F) 105, a Universal Serial Bus (USB) I/F 106, and a network I/F 107.

The CPU 101 is a system control unit and is configured to control the overall operation of the PC A 100.

The ROM 102 stores fixed data such as control programs executed by the CPU 101, a data table, and an embedded operating system (hereinafter referred to as OS) program. In this embodiment, the control programs stored in the ROM 102 perform software execution control, such as scheduling, task switching, and interrupt processing, under management of the embedded OS stored in the ROM 102. In this embodiment, the ROM 102 further stores an initial setting program 108 for performing initial setting of the printer 110.

The RAM 103 is constituted by, for example, a static random access memory (SRAM), which requires backup power supply. The RAM 103 stores data by using a data backup primary battery (not illustrated), and is thus capable of storing important data, such as a program control variable, without volatilization. Further, the RAM 103 is provided with a memory area to store settings information of the PC A 100, management data of the PC A 100, and so on. The RAM 103 is also used as a main memory and a work memory for the CPU 101.

The display device 104 is constituted by a light-emitting diode (LED), a liquid crystal display (LCD), or the like, and is configured to display data or to notify the user of the state of the PC A 100. The display device 104 may have displayed thereon a soft keyboard including keys such as numeric input keys, a mode setting key, a set key, a cancel key, and a power key to accept input from the user through the display device 104.

The input I/F 105 is an interface for accepting input of data or operation instructions from the user. The input I/F 105 is constituted by a physical keyboard, buttons, a touch panel, or the like. The display device 104 and the input I/F 105 may have the same configuration and may be configured to output screens and accept operations from the user with the same configuration.

The USB I/F 106 is an interface for communicating with another apparatus via USB. In this embodiment, the USB I/F 106 is connectable to a USB I/F 117 included in the printer 110 via a USB cable 150.

The network I/F 107 is an interface for communicating with another apparatus via a network. In this embodiment, Wi-Fi (Wireless Fidelity) (registered trademark) is used as the wireless communication method of the network I/F 107. Alternatively, Bluetooth Classic (registered trademark) or the like may be used. Further, instead of a wireless network, a wired network may be used. In this embodiment, the network I/F 107 connects to a local area network (LAN) 152 via a network connection 151 using a wired network or a wireless network to communicate with the PC B 130 or the printer 110. When an information processing apparatus other than the PC B 130 or a communication apparatus other than the printer 110 is connected to the LAN 152, the network I/F 107 is also capable of communicating with the information processing apparatus or communication apparatus other than the PC B 130 or the printer 110.

The PC A 100 may include any one of the USB I/F 106 and the network I/F 107 or any other additional interface as an interface for communicating with another apparatus. Examples of the other interface include interfaces for performing communication in accordance with wireless communication methods such as near field communication (NFC) and Bluetooth Low Energy (registered trademark).

The PC B 130 has a configuration similar to that of the PC A 100, and will not be described. The PC B 130 is also connected to the LAN 152 via a network connection 154 by using a network I/F.

The printer 110 includes a CPU 111, a ROM 112, a RAM 113, a display device 114, an input I/F 115, a printing unit 116, the USB I/F 117, and a network I/F 118.

The CPU 111 is a system control unit and is configured to control the overall operation of the printer 110.

The ROM 112 stores fixed data such as control programs executed by the CPU 111, a data table, and an embedded OS program. In this embodiment, the control programs stored in the ROM 112 perform software execution control, such as scheduling, task switching, and interrupt processing, under management of the embedded OS stored in the ROM 112.

The RAM 113 is constituted by, for example, an SRAM, which requires backup power supply. The RAM 113 stores data by using a data backup primary battery (not illustrated), and is thus capable of storing important data, such as a program control variable, without volatilization. Further, the RAM 113 is provided with a memory area to store settings information of the printer 110, management data of the printer 110, and so on. The RAM 113 is also used as a main memory and a work memory for the CPU 111.

The display device 114 is constituted by an LED, an LCD, or the like, and is configured to display data or to notify the user of the state of the printer 110. The display device 114 may have displayed thereon a soft keyboard including keys such as numeric input keys, a mode setting key, a set key, a cancel key, and a power key to accept input from the user through the display device 114.

The input I/F 115 is an interface for accepting input of data or operation instructions from the user. The input I/F 115 is constituted by a physical keyboard, buttons, a touch panel, or the like. The display device 114 and the input I/F 115 may have the same configuration and may be configured to output screens and accept operations from the user with the same configuration.

The printing unit 116 forms an image on a recording medium such as a sheet of paper in accordance with a print job received from the PC A 100 or the PC B 130 via the USB cable 150 or the LAN 152 by using a recording agent such as ink, and outputs a printing result. In this embodiment, the printing unit 116 executes printing by using the inkjet method. Accordingly, the printing unit 116 includes a printhead that ejects ink.

The USB I/F 117 is an interface for communicating with another apparatus via USB.

The network I/F 118 is an interface for communicating with another apparatus via a network. In this embodiment, Wi-Fi (registered trademark) is used as the wireless communication method of the network I/F 118. Alternatively, Bluetooth Classic (registered trademark) or the like may be used. Further, instead of a wireless network, a wired network may be used. In this embodiment, the network I/F 118 connects to the LAN 152 via a network connection 153 to communicate with the PC A 100 or the PC B 130. When an information processing apparatus other than the PC A 100 or the PC B 130 is connected to the LAN 152, the network I/F 118 is also capable of communicating with the information processing apparatus other than the PC A 100 or the PC B 130.

The printer 110 may include any one of the USB I/F 117 and the network I/F 118 or any other additional interface as an interface for communicating with another apparatus. Examples of the other interface include interfaces for performing communication in accordance with wireless communication methods such as NFC and Bluetooth Low Energy (registered trademark).

Figure 2A:
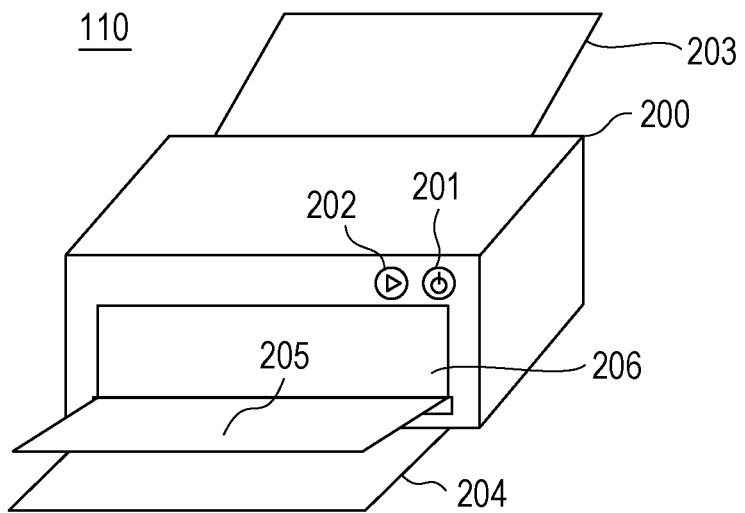
FIGS. 2A to 2C illustrate the external appearance of a communication apparatus.

FIG. 2A illustrates the external appearance of the printer 110. The printer 110 includes a housing 200, a power button 201, a start button 202, a sheet feed tray 203, a sheet discharge tray 204, an access cover 205, and an opening 206. The access cover 205 is turnable (movable) between a closed position at which the access cover 205 covers the opening 206 and an open position at which the access cover 205 does not cover the opening 206.

Figure 2B:
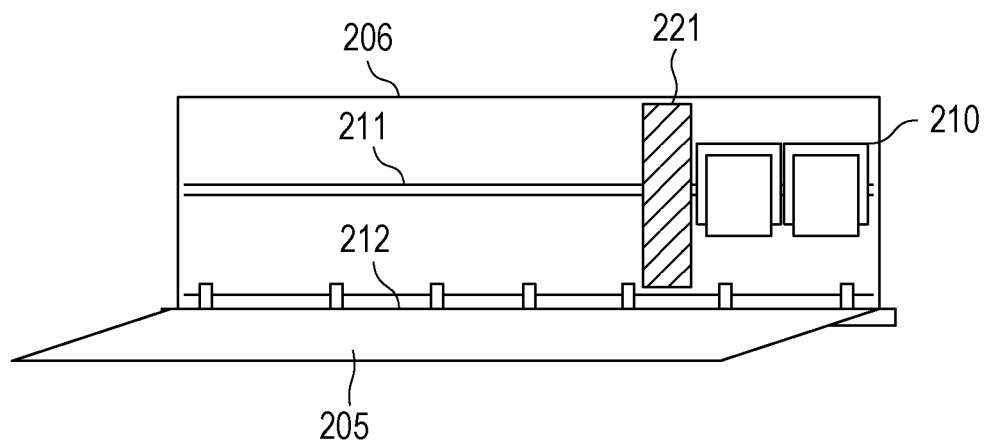

FIG. 2B illustrates the inside of the printer 110, which is visible from the opening 206 illustrated in FIG. 2A. The user is able to access the inside of the printer 110 by moving the access cover 205 to the open position to uncover the opening 206. Inside the printer 110 are ink holders 210, a shaft 211, a sheet feed roller 212, and a securing member 221.

The ink holders 210, each configured to hold an ink cartridge, move to the right and left along the shaft 211 to perform printing. A sheet on which printing is to be performed is fed by the sheet feed roller 212. The securing member 221 is a member for securing the ink holders 210 to prevent the ink holders 210 from moving to the right and left during transportation of the printer 110.

Figure 2C:
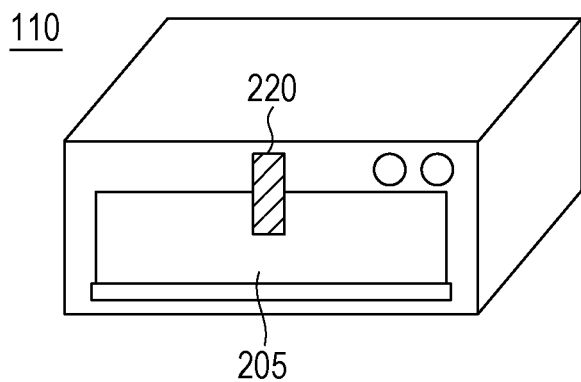

FIG. 2C illustrates the printer 110, which has just been unpacked from a packing carton. The access cover 205 is taped with packing tape 220 to prevent the access cover 205 from being opened and closed during transportation of the printer 110.

Initial Setting of Printer 110

After the printer 110 is removed (unpacked) from the packing carton, it is necessary to perform initial setting of the printer 110 to allow the printer 110 to perform printing. An initial setting process for the printer 110 according to this embodiment will now be described.

FIG. 3 illustrates a process (S300 to S308) executed by a user to perform initial setting for the printer 110 and an initial setting process (S310 to S317) executed by the printer 110. FIG. 3 also illustrates a notification process (S320 to S330) executed by the PC A 100 in accordance with the initial setting program 108 during the initial setting process executed by the printer 110. The process executed by the printer 110 is implemented by, for example, the CPU 111 actually reading a program stored in the ROM 112 into the RAM 113 and executing the program. The process executed by the PC A 100 is implemented by, for example, the CPU 101 actually reading the initial setting program 108 stored in the ROM 102 into the RAM 103 and executing the initial setting program 108.

First, when starting setup of the printer 110 (S300), the user removes the securing member 221 for the ink holders 210 and the packing tape 220 from the printer 110 (S301). Then, the user presses the power button 201 of the printer 110 to turn on the printer 110 (S302). Then, the user opens the access cover 205 of the printer 110 (S303), and attaches the ink cartridge to the printer 110 (S304). Then, the user closes the access cover 205 (S305). Thereafter, the user sets a sheet in the sheet feed tray 203 to prepare for a printhead registration adjustment process (S306), and then presses the start button 202 (S307). Accordingly, the printer 110 starts printhead registration adjustment. After the printhead registration adjustment is completed, the user finishes setup of the printer 110 (S308).

When the printer 110 is turned on in S302, the printer 110 starts the initial setting process (S310). Specifically, when the printer 110 is turned on, the printer 110 determines whether an initial-setting-in-progress flag is off. If it is determined that the initial-setting-in-progress flag is not off, the printer 110 starts the initial setting process. If it is determined that the initial-setting-in-progress flag is off, the printer 110 does not start the initial setting process. The initial-setting-in-progress flag is a flag that is turned on in response to turning on of the printer 110 when the initial-setting-in-progress flag does not remain off. At the completion of the initial setting process for the printer 110, the initial-setting-in-progress flag is turned off. Accordingly, even if the printer 110 is turned on under completion of the initial setting process, the initial setting process is not executed. That is, the initial-setting-in-progress flag is also information indicating whether the initial setting of the printer 110 is complete. Since the initial setting process is executed under such control, the initial setting process is a process that is executed in response to the user turning on the printer 110 for the first time after the printer 110 is unpacked, in other words. When the initial setting process is started, the printer 110 turns on the initial-setting-in-progress flag, which is stored and managed in the RAM 113 or the like (S311).

Then, the printer 110 prepares for connection to the PC A 100 (S312). Specifically, the printer 110 enables various interfaces and prepares for connection to the PC A 100 via the USB cable 150 or the network connection 153.

Then, the printer 110 starts an initialization process. In the initialization process, the printer 110 executes a process of moving the ink holders 210 so that the ink holders 210 are put in place. An error occurring in the printer 110 may prevent the printer 110 from completing the initialization process. To address this issue, when the printer 110 starts the initialization process, the printer 110 detects various errors occurring in the printer 110. Then, the printer 110 transmits error information concerning the detected errors to the PC A 100, if the printer 110 has been connected to the PC A 100, in response to an information obtaining request made in accordance with the initial setting program 108. Upon receipt of the error information, the PC A 100 displays a notification screen on the display device 104 to notify the user of the various errors occurring in the printer 110 in accordance with the error information. Examples of the errors that can occur in the printer 110 include a securing member non-removal error and a cover-open error. The securing member non-removal error is caused when the securing member 221 for the ink holders 210 is not removed in S301. The cover-open error is caused when the access cover 205 remains open (the access cover 205 is in open position). If the securing member non-removal error has occurred in the printer 110, the PC A 100 notifies the user of the securing member non-removal error by using a notification screen (S321). If the cover-open error has occurred in the printer 110, the PC A 100 notifies the user of the cover-open error by using a notification screen (S322). If no error is occurring or an error that occurred has been fixed by a user operation, the printer 110 completes the initialization process (S313).

After the completion of the initialization process, the printer 110 starts a printhead cleaning process. The printhead cleaning process includes, for example, a process of filling the printhead with ink from the ink cartridge attached to the printer 110, and a process of cleaning an ink ejection port in the printhead. An error occurring in the printer 110 may prevent the printer 110 from completing the cleaning process. To address this issue, when the printer 110 starts the cleaning process, the printer 110 detects various errors occurring in the printer 110. Then, the printer 110 transmits error information concerning the detected errors to the PC A 100, if the printer 110 has been connected to the PC A 100, in response to an information obtaining request made in accordance with the initial setting program 108. Examples of the errors that can occur in the printer 110 include a cover-open error and an ink non-attachment error (no-ink error). The ink non-attachment error is caused by non-attachment of the ink cartridge to the printer 110. If the cover-open error is occurring in the printer 110, the PC A 100 notifies the user of the cover-open error by using a notification screen (S323). If the ink non-attachment error is occurring in the printer 110, the PC A 100 notifies the user of the ink non-attachment error by using a notification screen (S324). It takes several minutes for the printer 110 to complete the cleaning process. Thus, the printer 110 transmits notification information to the PC A 100 to notify the user that the cleaning process is in progress. Then, the PC A 100 displays a notification screen on the display device 104 to notify the user that the printer 110 is executing a cleaning process (S325). If no error is occurring or an error that occurred has been fixed by a user operation, the printer 110 completes the printhead cleaning process (S314).

An error occurring in the printer 110 may prevent the printer 110 from completing a registration adjustment process for adjusting the position at which the ink ejected from the printhead is fixed on a sheet. To address this issue, after the completion of the cleaning process, the printer 110 detects various errors occurring in the printer 110. Then, the printer 110 transmits error information concerning the detected errors to the PC A 100, if the printer 110 has been connected to the PC A 100, in response to an information obtaining request made in accordance with the initial setting program 108. Examples of the errors that can occur in the printer 110 include a cover-open error, an ink non-attachment error, and a no-paper error. The no-paper error is caused when no sheet is set in the sheet feed tray 203. If the cover-open error is occurring in the printer 110, the PC A 100 notifies the user of the cover-open error by using a notification screen (S326). If the ink non-attachment error is occurring in the printer 110, the PC A 100 notifies the user of the ink non-attachment error by using a notification screen (S327).

Thereafter, the printer 110 waits for the user to press the start button 202. Then, the printer 110 transmits notification information indicating that the printer 110 is in waiting mode to the PC A 100, if the printer 110 has been connected to the PC A 100, to notify the user that the printer 110 is waiting for the start button 202 to be pressed. Then, the PC A 100 displays a notification screen on the display device 104 to notify the user that the printer 110 is in waiting mode (S328).

When the start button 202 is pressed by the user, the printer 110 starts a printhead registration adjustment process. Even after the start of the registration adjustment process, the printer 110 detects an error that occurs in the printer 110, and transmits error information to the PC A 100. For example, if a no-paper error occurs in the printer 110, the PC A 100 notifies the user of the no-paper error by using a notification screen (S329). If no error is occurring or an error that occurred has been fixed by a user operation, the printer 110 completes the registration adjustment process (S315).

When the registration adjustment process is completed, the printer 110 turns off the initial-setting-in-progress flag stored and managed in the RAM 113 or the like (S316), and then the initial setting process ends (S317). Accordingly, the printer 110 is allowed to execute printing in accordance with a print job received from another apparatus or a print job directly input via the display device 114.

Initial Setting of PC A 100

To use the printer 110, it is necessary to perform initial setting of the PC A 100 to allow the PC A 100 to instruct the printer 110 to perform printing. An initial setting process for the PC A 100 according to this embodiment will now be described.

The initial setting of the PC A 100 is commonly executed under completion of the initial setting of the printer 110 described above. Specifically, for example, an instruction manual provided by the vendor of the printer 110 recommends a user to execute the initial setting of the PC A 100 after the initial setting of the printer 110 has been completed. However, some users may start the initial setting of the PC A 100 under non-completion of the initial setting of the printer 110.

The non-completion of the initial setting of the printer 110 indicates a state where the printer 110 is executing the initial setting process. In this state, the errors described with reference to FIG. 3 may occur in the printer 110. Thus, if the initial setting of the PC A 100 is started under non-completion of the initial setting of the printer 110, error information may be transmitted from the printer 110 to the PC A 100.

The transmission of error information from the printer 110 to the PC A 100 during the initial setting of the PC A 100 is not limited to a situation where the initial setting of the PC A 100 is started under non-completion of the initial setting of the printer 110. For example, even in a situation where the initial setting of the PC A 100 is started under completion of the initial setting of the printer 110, error information may be transmitted from the printer 110 to the PC A 100. Specifically, for example, it is assumed that the printer 110 for which initial setting has been completed is instructed by the PC B 130 to perform printing, which causes an error in the printer 110. In this situation, if the initial setting of the PC A 100 is started, error information may be transmitted from the printer 110 to the PC A 100.

In a situation where the initial setting of the PC A 100 is started under non-completion of the initial setting of the printer 110, it is desirable that the user of the PC A 100 fix the error caused in the printer 110 before completion of the initial setting of the printer 110. That is, in a situation where the initial setting of the PC A 100 is started under non-completion of the initial setting of the printer 110, it is desirable for the PC A 100 to notify the user of the error occurring in the printer 110.

In contrast, in a situation where the initial setting of the PC A 100 is started under completion of the initial setting of the printer 110, the user of the PC A 100 does not necessarily need to fix the error caused in the printer 110. That is, in a situation where the initial setting of the PC A 100 is started under completion of the initial setting of the printer 110, the PC A 100 does not necessarily need to notify the user of the error occurring in the printer 110. This is because under completion of the initial setting of the printer 110, the user of the PC A 100 is likely to give precedence to the completion of the initial setting of the PC A 100 over the fixing of the error. In this embodiment, furthermore, the initial setting process for the PC A 100 is executed by using the initial setting program 108, and the initial setting program 108 has no function of instructing the printer 110 to perform normal printing other than test printing described below. The test printing is printing of an image determined in advance for test printing (an image not selected as desired by the user), whereas the normal printing other than test printing is printing of an image based on image data selected as desired by the user. That is, the initial setting program 108 is a program for completing the initial setting of the printer 110 and the initial setting of the PC A 100, but is not a program for instructing the printer 110 to perform normal printing. Thus, the occurrence of an error in the printer 110 is not important for the user of the PC A 100 that is executing the initial setting program 108, so long as at least the initial setting of the printer 110 has been completed, and the user does not necessarily need to promptly fix the error. In addition, the initial setting program 108, which is operating on the PC A 100, provides only a test printing instruction (does not provide a normal printing instruction), and thus does not instruct the printer 110 to perform printing before the timing at which the state information of the printer 110 is obtained. Thus, an error caused under completion of the initial setting of the printer 110 is less likely to be an error caused by the PC A 100. That is, an error caused under completion of the initial setting of the printer 110 is more likely to be an error caused by the PC B 130 instructing the printer 110 to perform normal printing. If an error occurring in the printer 110 is an error caused by the PC B 130, the user of the PC B 130 is likely to fix the error caused in the printer 110. Thus, the PC A 100 does not need to provide notification.

Accordingly, this embodiment describes a scenario where whether the PC A 100 notifies the user of an error occurring in the printer 110 is controlled in accordance with whether the initial setting of the printer 110 is completed.

Figure 4:
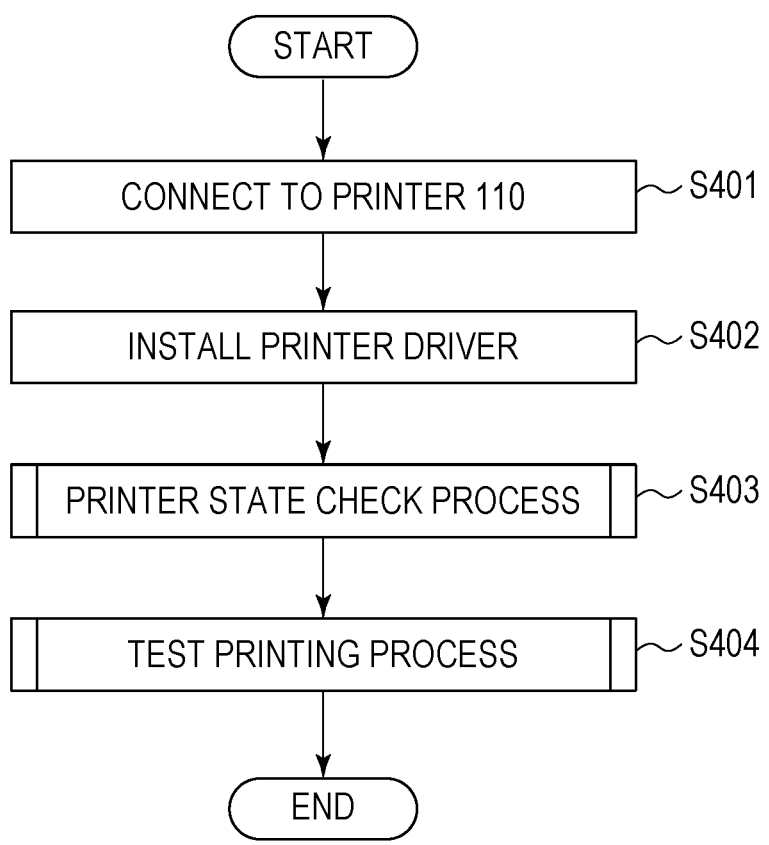
FIG. 4 is a flowchart illustrating an initial setting process executed by an information processing apparatus.

FIG. 4 is a flowchart illustrating an initial setting process executed by the PC A 100 in accordance with the initial setting program 108. The process illustrated in this flowchart is implemented by, for example, the CPU 101 reading the initial setting program 108 stored in the ROM 102 into the RAM 103 and executing the initial setting program 108. The process illustrated in this flowchart is started when the initial setting program 108 is started on the PC A 100.

Figure 5A:
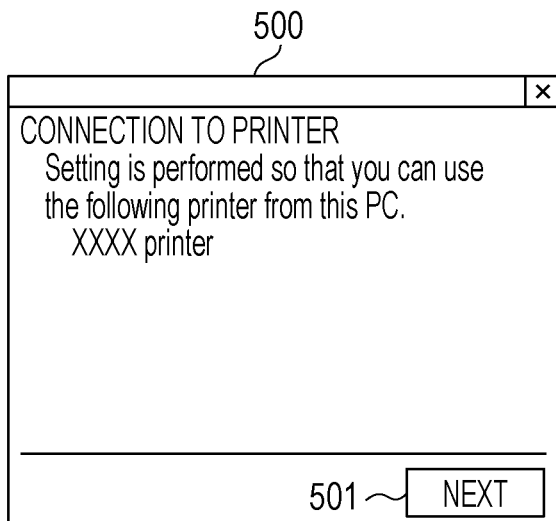
FIGS. 5A to 5F illustrate screens displayed by the information processing apparatus.

First, in S401, the CPU 101 connects the printer 110 and the PC A 100. Specifically, the CPU 101 searches for the printer 110 to which the PC A 100 is connected via USB or a LAN. Alternatively, the CPU 101 searches for a Wi-Fi beacon emitted from the printer 110 and finds the printer 110. Then, the CPU 101 connects the found printer 110 and the PC A 100. The PC A 100 may be connected to the printer 110 via USB or Wi-Fi. Thereafter, the CPU 101 notifies the user that the printer 110 is found, and displays a confirmation screen 500 (FIG. 5A) on the display device 104 to ask whether to perform setting so that the found printer 110 can be used from the PC A 100. When a Next button 501 on the confirmation screen 500 is pressed, the CPU 101 connects the printer 110 and the PC A 100, and then proceeds to S402.

Figure 5B:
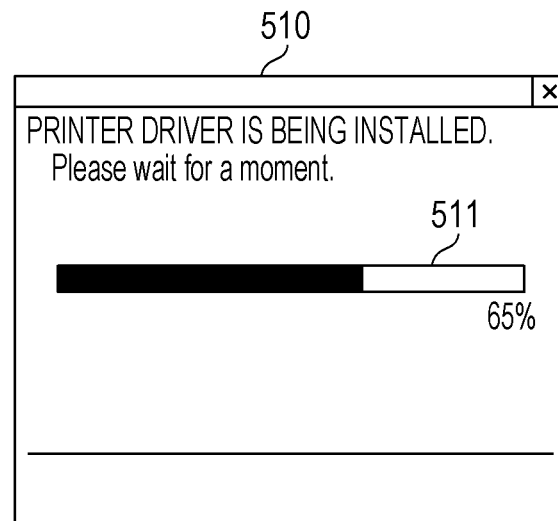

In S402, the CPU 101 installs a printer driver corresponding to the printer 110. The CPU 101 may obtain the printer driver from the printer 110 or from the Internet and install the printer driver. During installation of the printer driver, the CPU 101 displays an installation screen 510 (FIG. 5B) on the display device 104. The installation screen 510 includes a progress bar 511 indicating progress in the installation process. When the installation is completed, the CPU 101 proceeds to S403. At this time, for example, a program such as on a status monitor for notifying the user of the status of the printer 110 or on utility for maintenance of the printer 110 may also be installed in the PC A 100 together with the printer driver.

In S403, the CPU 101 executes a printer state check process to check the state of the printer 110. The details of this process will be described below with reference to FIG. 6. When the printer state check process is completed, the CPU 101 proceeds to S404.

Figure 5C:
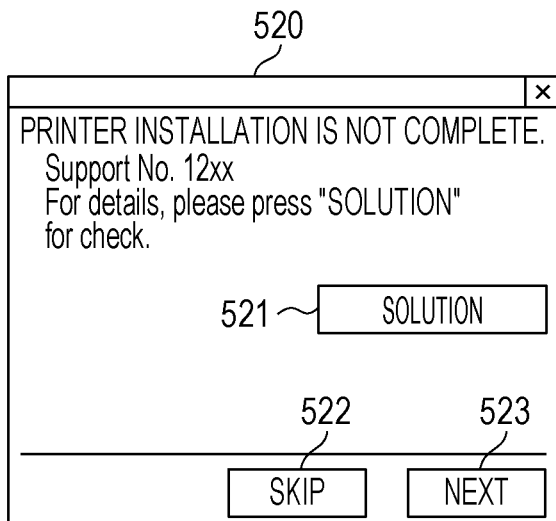
Figure 5D:
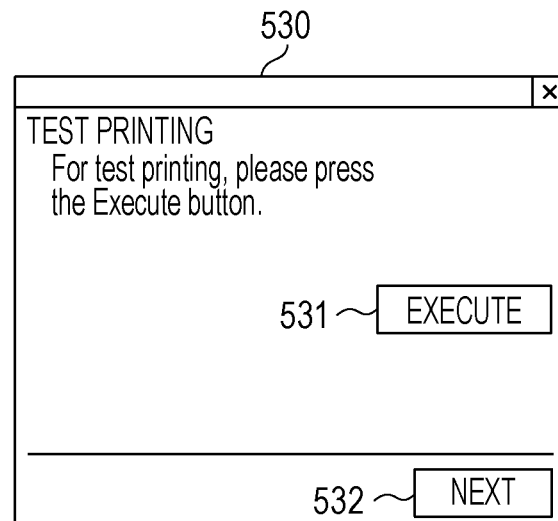
Figure 5E:
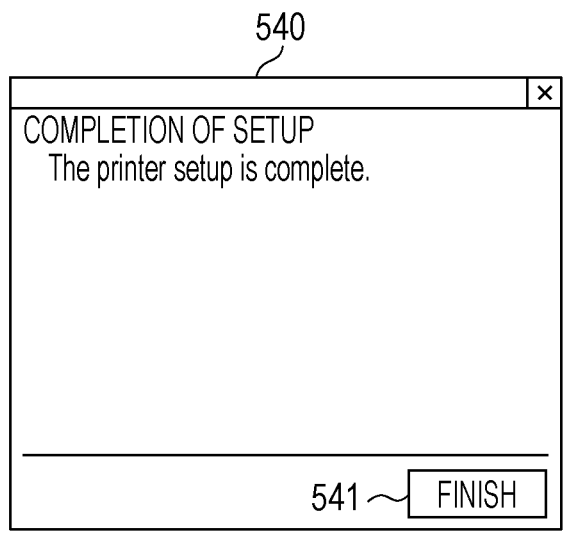

In S404, the CPU 101 executes a test printing process to instruct the printer 110 to perform test printing to check whether the printer 110 can correctly perform printing in accordance with an instruction from the PC A 100. In this embodiment, in the test printing process, first, the CPU 101 displays an instruction screen 530 (FIG. 5D) on the display device 104 to accept an instruction for executing test printing. Upon receipt of the pressing of a Next button 532 by the user, the CPU 101 ends the process based on the initial setting program 108 without instructing the printer 110 to perform test printing. On the other hand, upon receipt of the pressing of an Execute button 531, the CPU 101 instructs the printer 110 to perform test printing via the connection established in S401. If the processing of S401 and S402 is correctly completed, a test printing instruction is correctly transmitted to the printer 110. In response to the test printing instruction, the printer 110 executes printing based on print data determined in advance for test printing. The completion of the test printing allows the user to recognize a correct connection between the PC A 100 and the printer 110. At this time, for example, if an error is occurring in the printer 110, test printing is not executed, and thus the printer 110 transmits error information to the PC A 100. The CPU 101 may provide a notification based on the error information in accordance with the initial setting program 108 or by using the status monitor or the like installed together with the printer driver in S402. Upon receipt of the notification of the completion of the test printing from the printer 110, the CPU 101 displays a completion screen 540 (FIG. 5E) on the display device 104. That is, the CPU 101 notifies the user that the setup of the printer 110 is completed and that the printer 110 can be controlled by the PC A 100. When a Finish button 541 is pressed on the completion screen 540, the CPU 101 ends the process based on the initial setting program 108.

Figure 6:
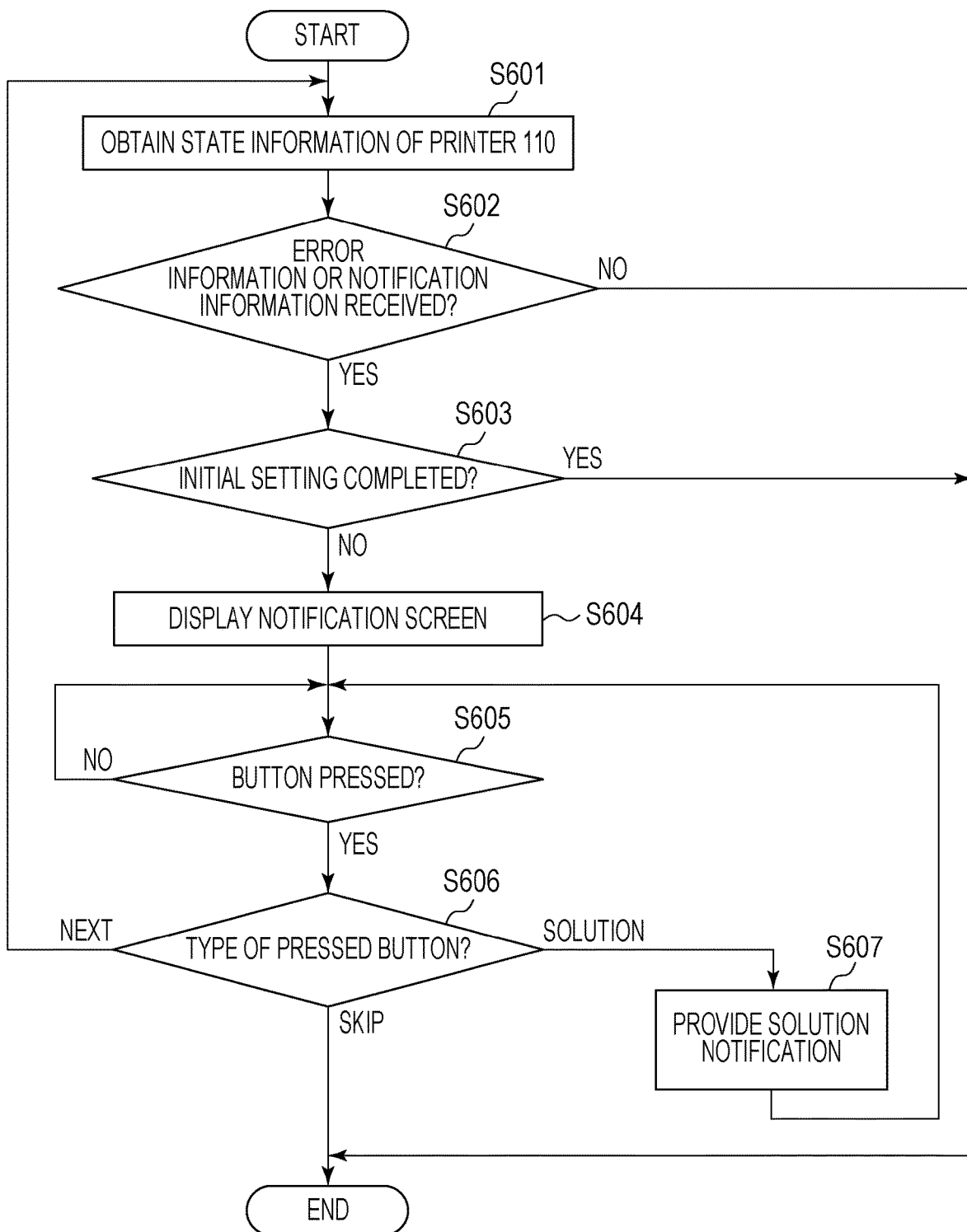
FIG. 6 is a flowchart illustrating a state check process executed by the information processing apparatus.

FIG. 6 is a flowchart illustrating a state check process executed by the PC A 100 in accordance with the initial setting program 108. The process illustrated in this flowchart is implemented by, for example, the CPU 101 reading the initial setting program 108 stored in the ROM 102 into the RAM 103 and executing the initial setting program 108. That is, the process illustrated in this flowchart is executed, with the initial setting program 108 operating on the PC A 100. The process illustrated in this flowchart corresponds to the processing of S403.

First, in S601, the CPU 101 obtains, from the printer 110, state information of the printer 110. The state information of the printer 110 may include error information concerning an error occurring in the printer 110, notification information for notifying the user of a process being executed by the printer 110, information concerning the state of the initial-setting-in-progress flag, and so on. The obtained state information may include the error information and the notification information described with reference to FIG. 3. If the initial setting of the printer 110 has been completed, the obtained state information includes information indicating that the initial-setting-in-progress flag is off. If the initial setting of the printer 110 has not been completed, the obtained state information includes information indicating that the initial-setting-in-progress flag is on.

Then, in S602, the CPU 101 determines whether the received state information includes at least one of error information and notification information. If YES is determined, the CPU 101 proceeds to S603. If NO is determined, the CPU 101 ends the process in this flowchart, and then proceeds to S404.

In S603, the CPU 101 determines whether the initial setting of the printer 110 has been completed. Specifically, if the initial-setting-in-progress flag is off (after the flag-off processing of S316), the CPU 101 determines that the initial setting of the printer 110 has been completed. On the other hand, if the initial-setting-in-progress flag is on (during processing from the flag-on processing of S311 to the flag-off processing of S316), the CPU 101 determines that the initial setting of the printer 110 has not been completed. If YES is determined, the CPU 101 ends the process in this flowchart, and then proceeds to S404. That is, in this embodiment, after the completion of the initial setting of the printer 110, even if an error is occurring in the printer 110, the CPU 101 does not notify the user of the error. If NO is determined, the CPU 101 proceeds to S604. The determination of S603 may be executed before the determination of S602. In this case, if it is determined in S603 that the initial setting of the printer 110 has been completed, the processing of S604 may be executed without execution of the processing of S602.

In S604, the CPU 101 displays a notification screen 520 (FIG. 5C) on the display device 104 on the basis of the information received in S601 to notify the user of an error occurring in the printer 110 or a process being executed by the printer 110. The notification screen 520 includes a Solution button 521, a Skip button 522, and a Next button 523. The Solution button 521 is a button for presenting a solution to fix the error occurring in the printer 110. The Skip button 522 is a button for allowing the user to proceed to the next process without fixing the error occurring in the printer 110. The Next button 523 is a button for allowing the user to proceed to the next process after fixing the error occurring in the printer 110. The "support No." on the notification screen 520 differs depending on the type of the error occurring in the printer 110 or the type of the process being executed by the printer 110. The user may not be notified of the type of an error occurring in the printer 110, but may be simply notified of the occurrence of an error in the printer 110.

In S605, the CPU 101 determines whether any button has been pressed on the notification screen 520. If YES is determined, the CPU 101 proceeds to S606. If NO is determined, the CPU 101 executes the processing of S605 again.

In S606, the CPU 101 determines the type of the button pressed on the notification screen 520. If the button pressed on the notification screen 520 is the Solution button 521, the CPU 101 proceeds to S607. If the button pressed on the notification screen 520 is the Skip button 522, the CPU 101 ends the process in this flowchart, and then proceeds to S404. If the button pressed on the notification screen 520 is the Next button 523, the CPU 101 returns to S601 to check whether the error caused in the printer 110 has been fixed or whether the process executed by the printer 110 has been completed.

Figure 7A:
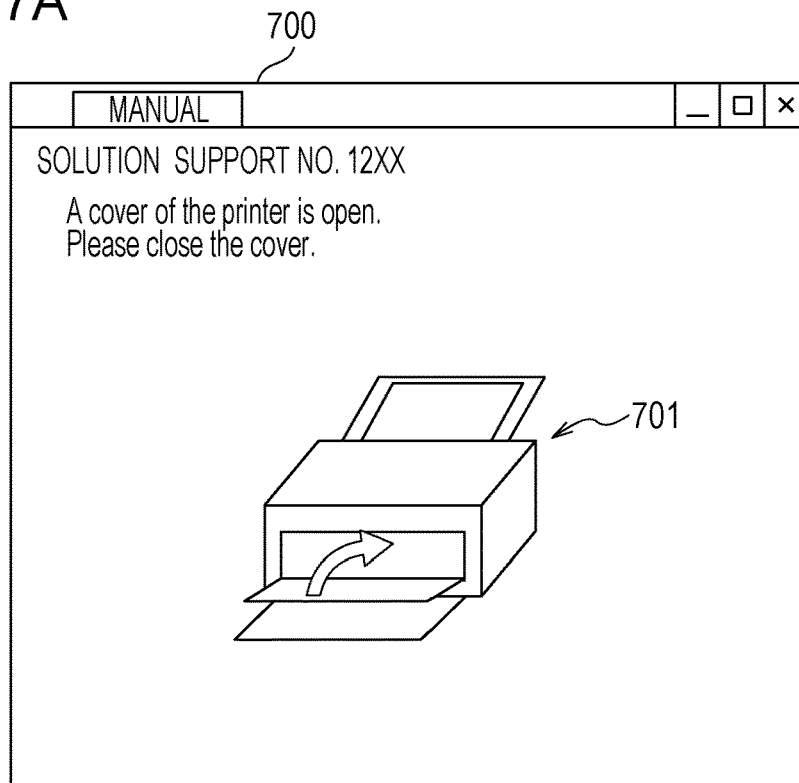
FIGS. 7A and 7B illustrate solution screens displayed by the information processing apparatus.
Figure 7B:
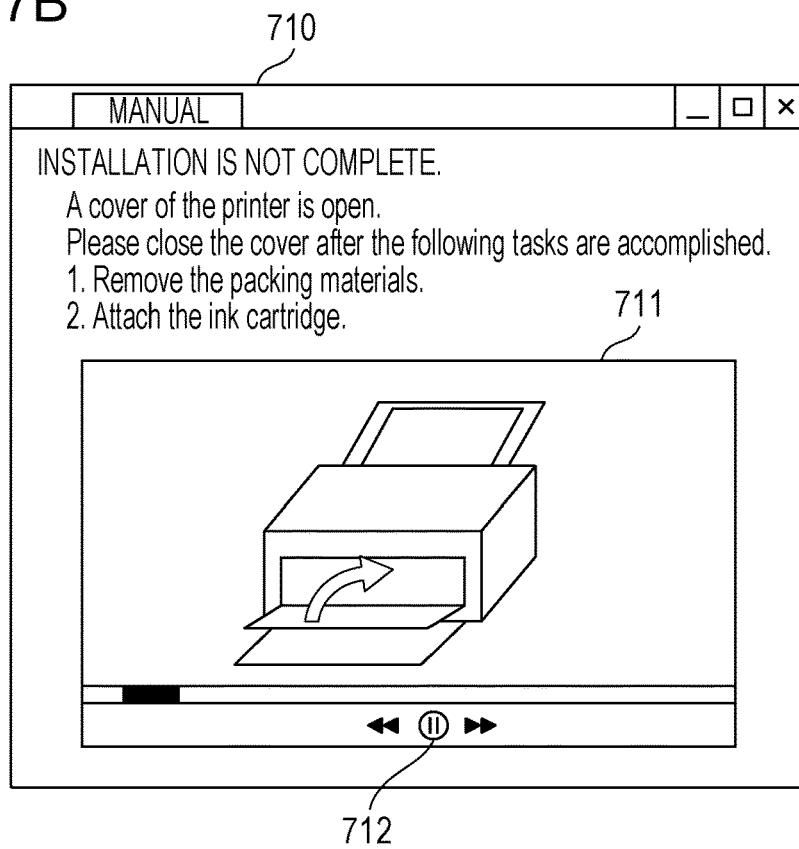

In S607, the CPU 101 starts a web browser and displays a solution screen 700 (FIG. 7A) on the display device 104 by using the web browser. The solution screen 700 is web content describing a solution to fix the error occurring in the printer 110. The solution screen 700 illustrated in FIG. 7A is a screen that provides a solution to fix a cover-open error occurring in the printer 110. As a solution to fix the cover-open error, an image 701 for prompting the user to close the cover is displayed on the solution screen 700. The content of the solution screen 700 displayed in this case differs depending on the error occurring in the printer 110. This is because the uniform resource locator (URL) input on the web browser differs in accordance with the error occurring in the printer 110. In S607, as illustrated in FIG. 7B, a solution screen 710 may be displayed to present a more detailed solution procedure to the user by using video content 711. Alternatively, the CPU 101 may display a solution screen on a screen displayed using the initial setting program 108, instead of on a screen displayed using the web browser. When the web browser that presents the solution screen is closed, the screen displayed on the display device 104 is returned to the notification screen 520. Accordingly, the CPU 101 returns to S605, and waits for a user operation on the notification screen 520.

In this embodiment, therefore, when the initial setting of the PC A 100 is executed under non-completion of the initial setting of the printer 110 (during the initial setting executed by the printer 110), the PC A 100 notifies the user of the error caused in the printer 110. In contrast, when the initial setting of the PC A 100 is executed under completion of the initial setting of the printer 110, the PC A 100 does not notify the user of the error caused in the printer 110. This allows the user of the PC A 100 to be notified of necessary information. Further, this can reduce instances of the user of the PC A 100 being notified of less necessary information; this improves the user's experience and efficiency of interacting with the PC A 100 when operating the underlying printing apparatus.

It is assumed that, although an error is occurring in the printer 110 under completion of the initial setting of the printer 110, through a process according to this embodiment, the PC A 100 does not notify the user of the error during the initial setting executed by the PC A 100. Then, it is assumed that the user of the PC A 100 executes normal printing by using the printer 110 immediately after the completion of the initial setting of the PC A 100. In this case, due to the still occurring error in the printer 110, the user of the PC A 100 is unable to execute normal printing by using the printer 110. However, a program for executing normal printing (e.g., the program installed in S402) has a normal error notification function. The normal error notification function is a function of executing a notification process if an error is occurring in the printer 110, regardless of whether the initial setting of the PC A 100 has been completed. Accordingly, in the situation described above, the user is not notified of the error in accordance with the initial setting program 108, but is notified of the error in accordance with the program for executing normal printing notification. Thus, the user is able to recognize the error occurring in the printer 110.

In this embodiment, furthermore, the initial-setting-in-progress flag is present separately from various types of error information. This enables the printer 110 to use various types of error information both during initial setting and during operations other than the initial setting.

Second Embodiment

In the embodiment described above, the PC A 100 transmits a test printing instruction to the printer 110 without checking the state of the printer 110 in the test printing process. This embodiment describes a scenario where a test printing instruction is transmitted to the printer 110 after the state of the printer 110 is checked in the test printing process.

A communication system according to this embodiment is similar to the communication system according to the first embodiment, unless otherwise stated.

Figure 8:
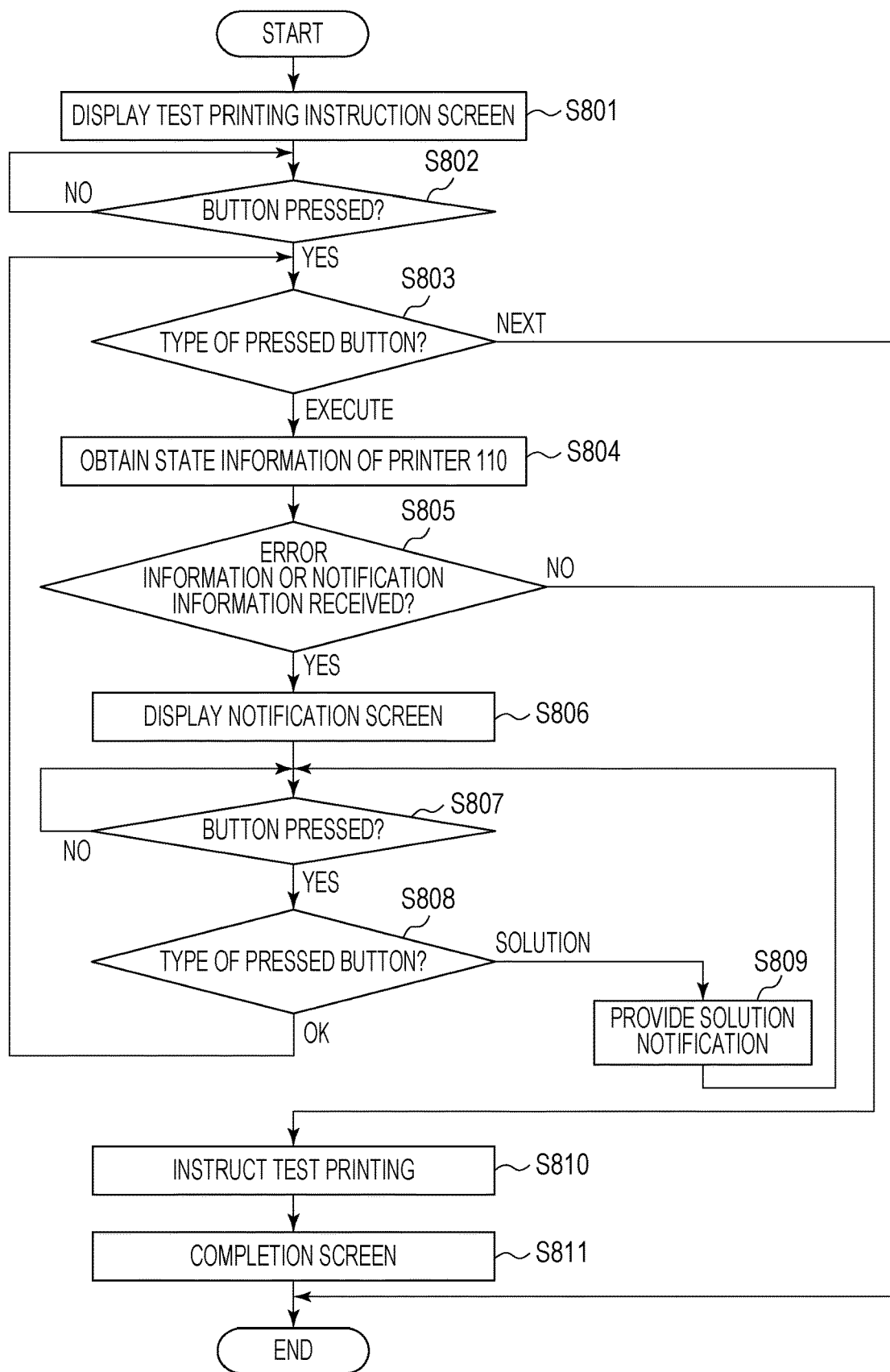
FIG. 8 is a flowchart illustrating a test printing process executed by the information processing apparatus.

FIG. 8 is a flowchart illustrating a test printing process executed by the PC A 100 in accordance with the initial setting program 108. The process illustrated in this flowchart is implemented by, for example, the CPU 101 loading the initial setting program 108 stored in the ROM 102 into the RAM 103 and executing the initial setting program 108. Further, the process illustrated in this flowchart is executed instead of the processing of S404 according to the first embodiment.

First, in S801, the CPU 101 displays the instruction screen 530 (FIG. 5D) on the display device 104 to accept an instruction for executing test printing.

Then, in S802, the CPU 101 determines whether any button has been pressed on the instruction screen 530. If YES is determined, the CPU 101 proceeds to S803. If NO is determined, the CPU 101 executes the processing of S802 again.

Then, in S803, the CPU 101 determines the type of the button pressed on the instruction screen 530. If the button pressed on the instruction screen 530 is the Execute button 531, the CPU 101 proceeds to S804. If the button pressed on the instruction screen 530 is the Next button 532, the CPU 101 ends the process in this flowchart.

Then, in S804, the CPU 101 obtains, from the printer 110, state information of the printer 110.

Then, in S805, the CPU 101 determines whether the received state information includes at least one of error information and notification information. If YES is determined, the CPU 101 proceeds to S806. If NO is determined, the CPU 101 proceeds to S810.

Figure 5F:
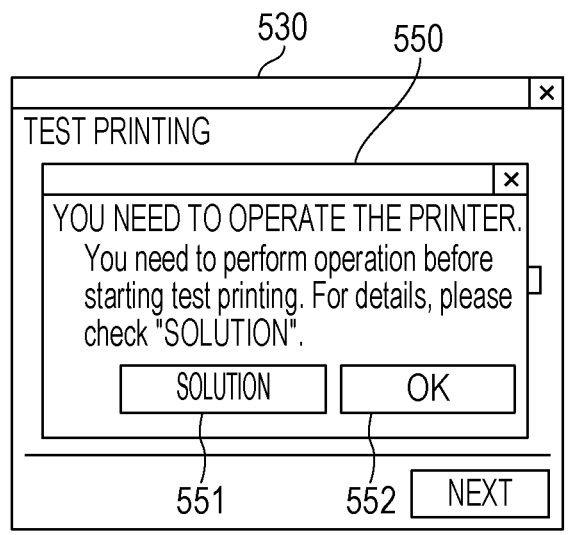

In S806, the CPU 101 displays a notification screen 550 (FIG. 5F) on the instruction screen 530 on the basis of the information received in S804 to notify the user of an error occurring in the printer 110 or a process being executed by the printer 110. The notification screen 550 includes a Solution button 551 for displaying a solution to fix the error occurring in the printer 110, and an OK button 552. Unlike the notification screen 520, the notification screen 550 includes no Skip button. This is because the printer 110 is unable to execute test printing unless the error occurring in the printer 110 is fixed. The notification screen 550 may notify the user of the type of the error occurring in the printer 110 or simply notify the user of the occurrence of an error in the printer 110.

In S807, the CPU 101 determines whether any button has been pressed on the notification screen 550. If YES is determined, the CPU 101 proceeds to S808. If NO is determined, the CPU 101 executes the processing of S807 again.

In S808, the CPU 101 determines the type of the button pressed on the notification screen 550. If the button pressed on the notification screen 550 is the Solution button 551, the CPU 101 proceeds to S809. If the button pressed on the notification screen 550 is the OK button 552, the CPU 101 returns to S803 to check whether the error caused in the printer 110 has been fixed or whether the process executed by the printer 110 has been completed.

In S809, the CPU 101 starts a web browser and displays the solution screen 700 (FIG. 7A) on the display device 104 by using the web browser. The solution screen 700 is web content describing a solution to fix the error occurring in the printer 110. When the web browser that presents the solution screen is closed, the screen displayed on the display device 104 is returned to the notification screen 550. Accordingly, the CPU 101 returns to S807, and waits for a user operation on the notification screen 550.

If no error is occurring in the printer 110 or no process is being executed by the printer 110, then, in S810, the CPU 101 instructs the printer 110 to perform test printing. If processing such as processing of S401 and S402 is correctly completed, a test printing instruction is correctly transmitted to the printer 110, and the printer 110 executes test printing. Upon receipt of a notification of completion of the test printing by the printer 110 from the printer 110, the CPU 101 proceeds to S811.

In S811, the CPU 101 displays the completion screen 540 (FIG. 5E) on the display device 104 to notify the user that the setup of the printer 110 is completed. When the Finish button 541 is pressed on the completion screen 540, the CPU 101 ends the process based on the initial setting program 108.

In this embodiment, accordingly, a test printing process is executed after the state of the printer 110 is checked. Thus, if an error is occurring in the printer 110, the user can be notified of the error. This can prevent the printer 110 from failing to complete test printing due to the occurrence of an error.

In this embodiment, furthermore, in the test printing process, unlike the state check process, the notification of an error caused in the printer 110 is provided, regardless of whether the initial setting of the printer 110 has been completed (whether the initial-setting-in-progress flag is off). This can further prevent the printer 110 from failing to complete test printing due to the occurrence of an error.

In the foregoing description, the PC A 100 provides a test printing instruction in the initial setting process executed by the PC A 100. However, this is not limiting. For example, if an apparatus that can be used from the PC A 100 through an initial setting process has a scanner function, the PC A 100 may provide a test scan instruction instead of a test printing instruction. If the Skip button 522 has been selected on the notification screen 520 displayed in S403, a test scan process for providing a test scan instruction may not be executed.

Third Embodiment

In the embodiment described above, a test printing process is executed even when the Skip button 522 is selected on the notification screen 520. When the Skip button 522 is selected, due to an error occurring in the printer 110, the printer 110 is likely to fail to complete test printing even if a test printing instruction is provided in a test printing process. Accordingly, this embodiment describes switching between execution and non-execution of a test printing process in accordance with whether the Skip button 522 is selected on the notification screen 520.

A communication system according to this embodiment is similar to the communication system according to the first embodiment, unless otherwise stated.

FIG. 9 is a flowchart illustrating an initial setting process executed by the PC A 100 in accordance with the initial setting program 108. The process illustrated in this flowchart is implemented by, for example, the CPU 101 reading the initial setting program 108 stored in the ROM 102 into the RAM 103 and executing the initial setting program 108. The process illustrated in this flowchart is started when the initial setting program 108 is started on the PC A 100. The process illustrated in this flowchart is executed instead of the process illustrated in the flowchart in FIG. 4 according to the first embodiment.

The processing of S901 to S903 is similar to the processing of S401 to S403, and thus will not be described.

In S904, the CPU 101 determines whether the Skip button 522 is selected on the notification screen 520 displayed in S903. If YES is determined, the CPU 101 ends the process in this flowchart, and then ends the process based on the initial setting program 108. That is, if YES is determined, the CPU 101 does not execute a test printing process. On the other hand, if NO is determined, the CPU 101 proceeds to S905.

In S905, the CPU 101 executes a test printing process. The test printing process executed here may be that described in the first embodiment or that described in the second embodiment.

A user who selects the Skip button 522 on the notification screen 520 typically desires to promptly complete the initial setting. To meet the desire of the user, in this embodiment, when the Skip button 522 is selected on the notification screen 520, the initial setting can be completed without execution of a test printing process. In addition, in a situation where the printer 110 is likely to fail to complete test printing, a test printing instruction can be prevented from being provided to the printer 110.

Other Embodiments

The embodiments described above describe a scenario where flag information (initial-setting-in-progress flag), which is used to determine whether the printer 110 is in initial setting, is transmitted to the PC A 100 as information different from error information or notification information. However, this is not limiting. For example, the error information or notification information may include information for determining whether the printer 110 is in initial setting. Specifically, for example, the error information or notification information may be implemented as bit information, and whether the printer 110 is in initial setting may be determined by determining whether an unused bit in the error information or notification information is on or off. Alternatively, the error information or notification information may be coupled with information indicating whether the printer 110 is in initial setting.

The embodiments described above can also be implemented by the following process. A program that implements one or more functions in the embodiments described above is supplied to a system or an apparatus via a network or a storage medium, and one or more processors in a computer in the system or apparatus execute the program. The embodiments described above can also be implemented by a circuit (e.g., an application-specific integrated circuit (ASIC)) that implements one or more functions.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

What is claimed is:

1. A method for controlling an information processing apparatus configured to communicate with a printing apparatus which is configured to perform printing by a printing unit, and to execute a predetermined program, the method comprising:
   obtaining predetermined information based on completion or non-completion of an initial setting process of the printing apparatus,
   accepting a predetermined operation from a user via a screen displayed by the predetermined program when the predetermined program is operating on the information processing apparatus; and
   in a case where the printing apparatus is in a predetermined state and the predetermined information based on the completion of the initial setting process is obtained, not executing, at least based on the acceptance of the predetermined operation, a notification process relating to the predetermined state in the printing apparatus, even when the predetermined program is operating on the information processing apparatus, and executing, based on the acceptance of the predetermined operation, a process for installing a printer driver in the information processing apparatus.

2. The method according to claim 1, wherein the process for installing is a process for installing at least one program that is different from the predetermined program and includes the printer driver corresponding to the printing apparatus, and
   wherein the another program has a function of executing a process for notifying the user of an error occurring in the printing apparatus, regardless of whether the initial setting process has been completed for the printing apparatus.

3. The method according to claim 1, further comprising:
   transmitting a printing instruction to the printing apparatus to perform printing.

4. The method according to claim 3, further comprising:
   accepting from the user a predetermined input for transmitting the printing instruction to the printing apparatus after the execution of the process for installing,
   wherein the printing instruction is transmitted to the printing apparatus based on acceptance of the predetermined input.

5. The method according to claim 4, further comprising:
   in the case where the predetermined input is accepted and the printing apparatus is in the predetermined state under the state that the initial setting process is completed, executing the notification process.

6. The method according to claim 3, further comprising:
   after the predetermined input is accepted and the notification process is executed, accepting from the user a specific input indicating that the user does not fix the predetermined state in the printing apparatus; and
   in a case where the specific input is accepted, performing control so as not to transmit the printing instruction to the printing apparatus.

7. The method according to claim 3, wherein
the printing instruction causes the printing apparatus to perform test printing based on predetermined print data.

8. The method according to claim 7, wherein
the predetermined program is configured not to instruct the printing apparatus to perform printing other than the test printing.

9. The method according to claim 8, wherein the printing other than the test printing is printing of an image based on image data selected by the user.

10. The method according to claim 1, wherein
the initial setting process includes a process for moving the printing unit.

11. The method according to claim 1, wherein
the initial setting process includes at least one of a process for instructing filling the printing unit with an ink, a registration adjustment process for adjusting a position of an ink ejected from the printing unit, and a process of cleaning the printing unit.

12. The method according to claim 1, wherein
the initial setting process is executed based on turning on of the printing apparatus in a state that predetermined flag information managed by the printing apparatus indicates that the initial setting process for the printing apparatus is not completed.

13. The method according to claim 1, wherein
the notification process comprises at least one of:
a process for displaying a screen, on the information processing apparatus, to notify the user of the printing apparatus being in the predetermined state; and
a process for notifying, on the information processing apparatus, the user of the non-completion of the initial setting process.

14. The method according to claim 1, wherein
the notification process comprises a process for notifying the user of a method for fixing the predetermined state in the printing apparatus.

15. The method according to claim 14, wherein
the process for notifying the user of the method for fixing the predetermined state in the printing apparatus comprises a process for displaying a button for displaying a screen by using a browser to notify the user of the method for fixing the predetermined state in the printing apparatus.

16. The method according to claim 1, wherein
the predetermined state in the printing apparatus under completion of the initial setting process for the printing apparatus is a state caused by another apparatus different from the information processing apparatus instructing the printing apparatus to perform printing.

17. The method according to claim 1, wherein
the state that the initial setting process for the printing apparatus is not completed is a state where the printing apparatus is executing the initial setting process.

18. An information processing apparatus for communicating with a printing apparatus which is configured to perform printing by a printing unit, the information processing apparatus executing a predetermined program, comprising at least one processor, wherein the at least one processor is configured to function as:
an obtaining unit configured to obtain predetermined information based on completion or non-completion of an initial setting process of the printing apparatus,
an accepting unit configured to accept a predetermined operation from a user via a screen displayed by the predetermined program when the predetermined program is operating on the information processing apparatus; and
an executing unit configured to,
in a case where the printing apparatus is in a predetermined state and the predetermined information based on the completion of the initial setting process is completed is obtained, not execute, at least based on the acceptance of the predetermined operation, a notification process relating to the predetermined state in the printing apparatus, even when the predetermined program is operating on the information processing apparatus, and execute, based on the acceptance of the predetermined operation, a process for installing a printer driver in the information processing apparatus.

19. A non-transitory computer-readable medium storing instructions that, when executed by an information processing apparatus, cause the information processing apparatus to perform operations comprising:
obtaining predetermined information based on completion or non-completion of an initial setting process of the printing apparatus,
accepting a predetermined operation from a user via a screen displayed by a predetermined program when the predetermined program is operating on the information processing apparatus; and
in a case where the printing apparatus is in a predetermined state and the predetermined information based on the completion of the initial setting process is obtained, not executing, at least based on the acceptance of the predetermined operation, a notification process relating to the predetermined state in the printing apparatus, even when the predetermined program is operating on the information processing apparatus, and executing, based on the acceptance of the predetermined operation, a process for installing a printer driver in the information processing apparatus.

20. The method according to claim 1, further comprising:
in a case where the printing apparatus is not in the predetermined state and the predetermined information based on the non-completion of the initial setting process is obtained, not executing, at least based on the acceptance of the predetermined operation, the notification process and executing, based on the acceptance of the predetermined operation, the process for installing.

21. The method according to claim 1, further comprising:
in the case where the printing apparatus is in the predetermined state and the predetermined information based on the non-completion of the initial setting process is obtained, executing, based on the acceptance of the predetermined operation, a display process for displaying a screen concerning an adjustment process for adjusting a position of an ink ejected from the printing unit executed in the printing apparatus.

22. The method according to claim 21,
wherein, in the case where the printing apparatus is in the predetermined state and the predetermined information based on the completion of the initial setting process is obtained, the display process is not executed at least based on the acceptance of the predetermined operation, even when the program is operating on the information processing apparatus.

23. The method according to claim 21, further comprising:
   in a case where the printing apparatus is not in the predetermined state and the predetermined information based on the non-completion of the initial setting process is obtained, executing the display process based on the acceptance of the predetermined operation.

24. The method according to claim 1,
   wherein the predetermined state is at least one of a state where an ink cartridge is not attached to the printing apparatus, a state where a sheet is not set in the printing apparatus, or a state where a cover of the printing apparatus is not closed.

25. The method according to claim 1,
   wherein the predetermined program is different from an operating system.

26. The method according to claim 1,
   wherein the notification process is a process for notifying that the printing apparatus is in the predetermined state.

27. The method according to claim 1,
   wherein the notification process varies depending on a type of the predetermined state.

28. The method according to claim 1, wherein,
   the notification process is a process for prompting the user to solve the predetermined state in the printing apparatus.

29. The method according to claim 1, wherein
   in a case where the printing apparatus is in the predetermined state and the predetermined information based on the non-completion of the initial setting process is obtained, executing, based on the acceptance of the predetermined operation, the notification process.

30. The method according to claim 29, further comprising:
   obtaining state information, the state information being information concerning a state of the printing apparatus,
   wherein the notification process is executed based on the obtained state information.

31. The method according to claim 1, wherein the process for installing the printer driver is executed in a case where the obtained predetermined information is based on the non-completion of the initial setting process and the printing apparatus is in the predetermined state.

\* \* \* \* \*